US011330542B2

(12) United States Patent
Sartori et al.

(10) Patent No.: US 11,330,542 B2
(45) Date of Patent: May 10, 2022

(54) SYSTEM AND METHOD FOR DEVICE-TO-DEVICE SYNCHRONIZATION

(71) Applicant: Futurewei Technologies, Inc., Plano, TX (US)

(72) Inventors: Philippe Sartori, Plainfield, IL (US); Deping Liu, Beijing (CN); Brian Classon, Beijing (CN); Qiang Li, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 29 days.

(21) Appl. No.: 16/716,140

(22) Filed: Dec. 16, 2019

(65) Prior Publication Data

US 2020/0120626 A1 Apr. 16, 2020

Related U.S. Application Data

(63) Continuation of application No. 14/530,269, filed on Oct. 31, 2014, now Pat. No. 10,560,908.
(Continued)

(51) Int. Cl.
*H04W 72/04* (2009.01)
*H04W 56/00* (2009.01)
(Continued)

(52) U.S. Cl.
CPC ....... *H04W 56/001* (2013.01); *H04W 56/002* (2013.01); *H04W 8/005* (2013.01); *H04W 76/14* (2018.02)

(58) Field of Classification Search
CPC . H04W 56/001; H04W 56/002; H04W 76/14; H04W 8/005
See application file for complete search history.

(56) References Cited

U.S. PATENT DOCUMENTS 9,426,701 B2   8/2016  Yu et al.
9,432,818 B2 * 8/2016  Yu ........................... H04W 4/08
(Continued)

FOREIGN PATENT DOCUMENTS

JP   2016521067 A   7/2016

OTHER PUBLICATIONS

"3rd Generation Partnership Project; Technical Specification Group Services and System Aspects; Feasibility Study for Proximity Services (ProSe) (Release 12)," 3 GPP TR 22.803, V12.0.0, Dec. 2012, 40 pages.
(Continued)

*Primary Examiner* — Phuc H Tran
(74) *Attorney, Agent, or Firm* — Slater Matsil, LLP

(57) ABSTRACT

A method and system for including a base station that configures a first user equipment (UE) that is in a radio resource control connected state with the base station. The UE is configured to be a synchronization source and transmit a first device-to-device synchronization signal (D2DSS) by using a synchronization resource that comprises a time resource, a frequency resource or a time and frequency resource. The base station instructs the first UE to transmit the first D2DSS using the synchronization resource. The base station signals the UE to configure the UE separately from the signal to transmit the D2DSS, and both of the signals are performed with radio resource control signaling from the base station to the UE.

21 Claims, 12 Drawing Sheets

Related U.S. Application Data

(60) Provisional application No. 61/898,194, filed on Oct. 31, 2013.

(51) Int. Cl.
*H04W 8/00* (2009.01)
*H04W 76/14* (2018.01)

(56) References Cited

U.S. PATENT DOCUMENTS

| | | | |
|---|---|---|---|
| 10,306,592 B2* | 5/2019 | Yu | H04W 8/005 |
| 2008/0075036 A1 | 3/2008 | Bertrand et al. | |
| 2010/0165882 A1 | 7/2010 | Palanki et al. | |
| 2012/0315841 A1 | 12/2012 | Zhou et al. | |
| 2013/0016649 A1 | 1/2013 | Damnjanovic et al. | |
| 2013/0083779 A1 | 4/2013 | Ahn et al. | |
| 2013/0148566 A1 | 6/2013 | Doppler et al. | |
| 2013/0159407 A1* | 6/2013 | Koskela | H04L 67/1076 709/204 |
| 2013/0316727 A1 | 11/2013 | Edge | |
| 2014/0302784 A1 | 10/2014 | Kim et al. | |
| 2014/0323126 A1* | 10/2014 | Ro | H04L 27/2655 455/434 |
| 2014/0335853 A1 | 11/2014 | Sartori et al. | |
| 2015/0117375 A1 | 4/2015 | Sartori et al. | |
| 2015/0271856 A1* | 9/2015 | Tong | H04W 8/005 455/426.1 |
| 2015/0304902 A1 | 10/2015 | Yu et al. | |
| 2016/0143077 A1 | 5/2016 | Fodor et al. | |
| 2016/0157273 A1* | 6/2016 | Ljung | H04W 88/04 455/435.1 |
| 2016/0234670 A1 | 8/2016 | Zhang et al. | |
| 2016/0234801 A1 | 8/2016 | Zhang et al. | |
| 2016/0270030 A1* | 9/2016 | Yu | H04W 72/005 |

OTHER PUBLICATIONS

3GPP TS 36.213 V11.4.0; 3rd Generation Partnership Project; Technical Specification Group Radio Access Network; Evolved Universal Terrestrial Radio Access (E-UTRA); Physical layer procedures (Release 11); Sep. 2013; 182 pages.

3GPP TS 36.331 V11.5.0; 3rd Generation Partnership Project; Technical Specification Group Radio Access Network; Evolved Universal Terrestrial Radio Access (E-UTRA); Radio Resource Control (RRC); Protocol specification (Release 11); 3013-9; 347 pages.

International Search Report and Written Opinion of the International Searching Authority received in Patent Cooperation Treaty Application No. PCT/US14/63522, dated Feb. 6, 2015, 10 pages.

3GPP TSG-RAN WG1 Meeting #73; R1-132261, Fukuoka, Japan, May 20-24, 2013' Source ITRI; "A Survey of Device to Device Discovery Approaches and the Associated Analysis for Power Consumption Approaches and LTE PHY Impacts"; 8 pages.

3GPP TSG RAN WG1 Meeting #74bis; R1-134242; Guangzhou, China, Oct. 7-11, 2013; Source NEC Group; "Discussion on resource allocation for D2D broadcast communication"; 6 pages.

"D2D Synchronization and Timing," Source: ZTE, Agenda Item: 7.2.8.11, Document for: Discussion and Decision, 3GPP TSG-RAN WG1 Meeting #74bis, R1-134306, Oct. 7-11, 2013, 8 pages.

"D2D Synchronization—with Network Coverage," Agenda Item: 7.2.8.1.1, Source: Nokia, NSN, Document for: Discussion and Decision, 3GPP TSG-RAN WG1 Meeting #74bis, Guangzhou, China, R1-134537, Oct. 7-11, 2013, 4 pages.

"WF on the D2D Synchronization Procedure," R1-134925, 7.2.8.1.1, Ericsson, Huawei, HiSilicon, LGE and General Dynamics, 3GPP Draft, Mobile Competence Centre, France, Oct. 2013, 4 pages.

3GPP TSG RAN WG1 Meeting #78; R1-143143; Dresden, Germany, Aug. 18-22, 2014; Source ZTE, "Discussion on Synchronization for Discovery"; 6 pages.

LG Electronics, "Details of Conditions for D2DSS Transmissions", 3GPP TSG RAN WG1 Meeting #78bis, R1-144016, Oct. 6-10, 2014, 6 Pages, Ljubljana, Slovenia.

3GPP TSG-RAN WG2 #83bis; Tdoc R2-133300; Ljubljana, Oct. 7-11, 2013; Source Ericsson; "Realization of D2D broadcast communication"; 7 pages.

Nokia et al, "UE based D2D synchronization scheme", 3GPP TSG-RAN WG1 Meeting #74bis, R1-134536, Oct. 7-11, 2013, 4 Pages, Guangzhou, China.

* cited by examiner

SYSTEM AND METHOD FOR DEVICE-TO-DEVICE SYNCHRONIZATION

CROSS-REFERENCE TO RELATED APPLICATIONS

This application is a continuation of U.S. application Ser. No. 14/530,269, filed on Oct. 31, 2014, and entitled "System and Method for Device-to-Device Synchronization," which claims the benefit of U.S. Provisional Application No. 61/898,194, filed Oct. 31, 2013, and entitled "System and Method for Device-to-Device Synchronization," which application is incorporated herein by reference.

TECHNICAL FIELD

The present invention relates to wireless communications, and, in particular embodiments, to a system and method for device to device synchronization.

BACKGROUND

Device-to-device (D2D) technology is getting attraction because of the ability to offer new services, improve system throughput, and offer a better user experience. For example, D2D can be used for Public Safety (PS) services. Other potential use cases for D2D have been identified by 3GPP SA WG1 in 3GPP TR 22.803 V12.0.0 (2012-12), which is incorporated herein by reference in its entirety.

D2D discovery and direct communication allows user equipments (UEs) in proximity to communicate with each other directly. Identified areas of application include services related to commercial services and public safety that would be of interest to operators and users.

Long Term Evolution (LTE) device-to-device proximity services may be evaluated as follows in terms of the connectivity and direct communications requirements in different wireless coverage regions.

SUMMARY

An embodiment method for device-to-device (D2D) communication includes using an uplink (UL) synchronization signal for the D2D communication.

An embodiment method includes configuring, by a base station, a first user equipment (UE) that is in a radio resource control connected (RRC_CONNECTED) state with the base station to be a synchronization source and transmit a first device-to-device synchronization signal (D2DSS) using a synchronization resource comprising a time resource, a frequency resource or a time and frequency resource. The base station instructs the first UE to transmit the first D2DSS according to the configuring. The configuring is signaled independently from the instructing. The configuring the first UE and the instructing the first UE to transmit are each performed with radio resource control (RRC) signaling transmitted from the base station.

An embodiment method includes receiving, by a user equipment (UE) and from a base station serving the UE, a first configuration by radio resource control (RRC) signaling, the first configuration instructing the UE to transmit a first device-to-device synchronization signal (D2DSS). The UE receives, from the base station, a second configuration by RRC signaling, the second configuration identifying a synchronization resource comprising a time resource, a frequency resource or a time and frequency resource for transmitting the first D2DSS by the UE. The first configuration is received independently from the second configuration. The UE transmits the first D2DSS in an uplink resource according to the first configuration and second configuration.

An embodiment method includes determining, by a base station comprising a first cell, a second user equipment (UE) in a neighboring second cell, the second UE providing a device-to-device synchronization signal (D2DSS) for a first UE within the first cell of the first base station. The method further includes indicating, by the first base station and to the first UE, the second UE that will be providing the D2DSS and transmitting, by the first base station, a message to a first UE indicating an uplink resource in which the first UE can expect to detect the D2DSS transmitted by a second UE.

An embodiment base station includes a transceiver configured to wirelessly communicate with UEs by RRC signaling and a processor in signal communication with the transceiver. The processor is configured to configure a first UE that is in an RRC_CONNECTED state with the base station to be a synchronization source and transmit a D2DSS using a synchronization resource comprising a time resource, a frequency resource or a time and frequency resource. The processor is further configured to instruct the first UE to transmit the D2DSS. The first UE is configured using signaling that is independent from signaling used to instruct the first UE, and the synchronization resource is selected by the base station.

An embodiment user equipment includes a transceiver configured to wirelessly communicate by RRC signaling and a processor in signal communication with the transceiver. The processor is configured to receive, through the transceiver and from a base station serving the UE, a first configuration by RRC signaling, the first configuration instructing the UE to transmit a first D2DSS. The processor is further configured to receive, through the transceiver and from the base station, a second configuration by RRC signaling, the second configuration identifying a synchronization resource comprising a time resource, a frequency resource, or a time and frequency resource for transmitting the first D2DSS by the UE. The first configuration is received independently from the second configuration. The processor is configured to transmit, through the transceiver, the first D2DSS in an uplink resource according to the first configuration and the second configuration.

An embodiment base station includes a transceiver 506 configured to wirelessly communicate with user equipments (UEs) within a first cell of the base station. The base station further includes a processor in signal communication with the transceiver and a nontransitory computer readable storage medium coupled to the processor. The nontransitory computer readable storage medium has stored therein instructions to determine a second UE in a neighboring second cell. The second UE provides a device-to-device synchronization signal (D2DSS) for a first UE within the first cell of the base station. The nontransitory computer readable storage medium further has stored therein instructions to transmit, through the transceiver, a first message to the first UE indicating the second UE that will be providing the D2DSS and transmit, through the transceiver, a second message to a first UE indicating an uplink resource in which the first UE can expect to detect the D2DSS transmitted by a second UE.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Additionally, the methods and apparatuses described may be applied to D2D discovery and D2D direct communication, but are not specifically limited to the same.

U.S. patent application Ser. No. 14/274,697, filed on May 10, 2014, which is hereby incorporated herein by reference, discloses a system and method for a controller for out-of-network device-to-device (D2D) communications. Embodiments described below may be used in conjunction with the embodiments disclose in the provisional patent application.

In D2D systems, a node transmitting synchronization signal is a synchronization source or a cluster head. User equipments (UEs) perform synchronization by synchronizing to a synchronization source based on the synchronization signal sent by the synchronization source. UEs synchronizing to one synchronization source can form a cluster. Synchronization signals may, for example be D2DSSes that are transmitted by a synchronization source to advertise, or alert UEs to the availability of a cluster. The cluster and cluster head are concepts for physical layer synchronization purposes, which is different from groups in a higher layer.

Figure 1A:
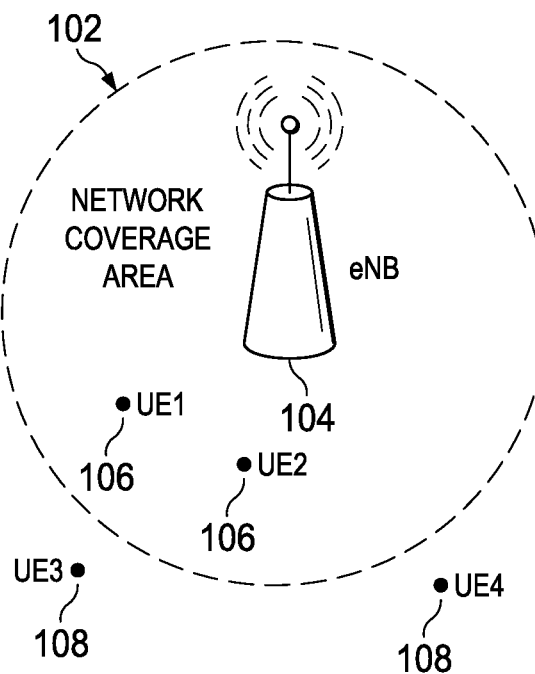
FIG. 1A illustrates various scenarios for relationships between user equipment devices (UEs) and a base station such as an E-UTRAN Node B/Evolved Node B (eNB)

In D2D discovery and communications, there are different scenarios for synchronization source(s) and cluster formation. FIG. 1A shows various scenarios for relationships between UEs 106 and 108 and a base station 104 such as an E-UTRAN Node B/Evolved Node B (eNB) 104. The base station 104 and UEs 106 and 108 each have a wireless transceiver and one or more processors that control the transmissions over the wireless transceivers. Additionally, the base stations 104 and UEs 106 and 108 have nontransitory computer readable storage mediums for storing instructions for processes and methods described herein and which are executed by processors of the base station 104 and UEs 106 and 108. It should be understood that, while the base station 104 is described in terms of an eNB 104, the base station is 104 not limited to such an arrangement, as the base station 104 may be any type of wireless communications base station.

Some in-coverage UEs 106 are within the coverage area 102 of the eNB 104, while some out-of-coverage UEs 108 are outside the coverage area 102 of the eNB 104. In some embodiments, clusters include an in-coverage cluster where all the UEs 106 are in the network coverage area 102, such as a cluster comprising UE1 and UE2. In other embodiments, out-of-coverage clusters have exclusively out-of-coverage UEs 108, such as a cluster comprising UE3 and UE4. In yet other embodiments, partially-in-coverage clusters have both in-coverage UEs 106 and out-of-coverage UEs 108, such as a cluster comprising UE1 and UE3. In such partially-in-coverage cluster arrangements, the cluster mitigates the interference between the in-coverage UEs 106 and the out-of-coverage UEs 108 that are close to the boundary of network coverage area 102.

The different scenarios for ProSe discovery where UEs such as UE1 and UE2 are located in-coverage/out-of-coverage of a cell are shown in FIGS. 1B through 1E. When UE1 has a role of transmission, UE1 sends D2D message and UE2 receives it. UE1 and UE2 can change their transmission and reception role. The transmission from UE1 can be received by one or more UEs such as UE2.

Figure 1B:
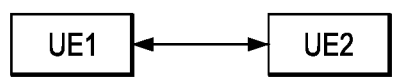
FIG. 1B illustrates an out-of-coverage case with UE1 and UE2 outside of the coverage area of an eNB according to an embodiment.

FIG. 1B illustrates an out-of-coverage case with UE1 and UE2 outside of the coverage area of an eNB according to an embodiment.

Figure 1C:
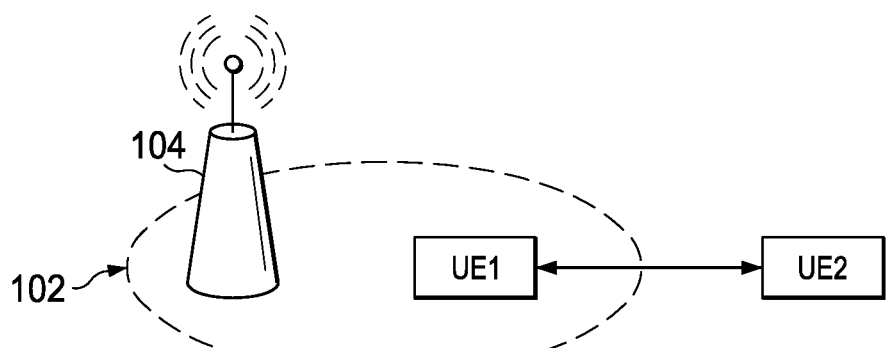
FIG. 1C illustrates a partial-coverage arrangement of UEs according to an embodiment.

FIG. 1C illustrates a partial-coverage arrangement of UEs according to an embodiment. In such an embodiment, the eNB 104 provides a coverage area 102, and UE1 is in coverage and UE2 is out of coverage.

Figure 1D:
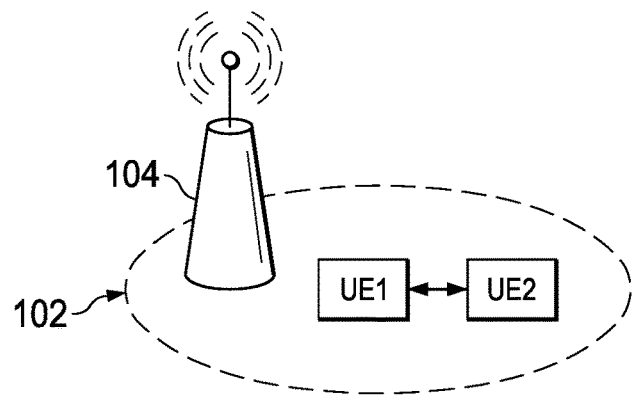
FIG. 1D illustrates an in-coverage-single-cell (intra-cell) arrangement of UEs according to an embodiment.

FIG. 1D illustrates an in-coverage-single-cell (intra-cell) arrangement of UEs according to an embodiment. In such an embodiment UE1 and UE2 is in-coverage within the coverage area 102 of the same eNB or cell.

Figure 1E:
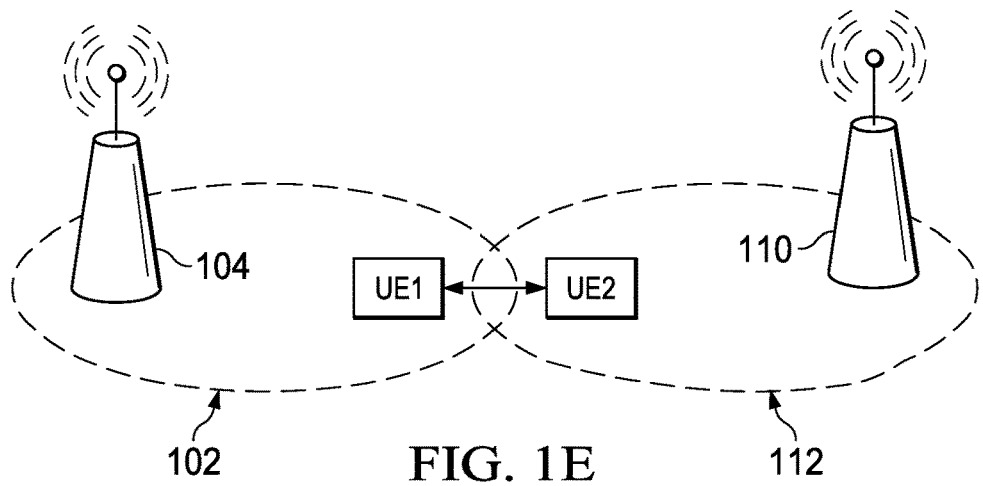
FIG. 1E illustrates an in-coverage-multi-cell (inter-cell) arrangement of UEs according to an embodiment.

FIG. 1E illustrates an in-coverage-multi-cell (inter-cell) arrangement of UEs according to an embodiment. In such an embodiment, UE1 is located in one cell and is in the coverage area 102 of a first eNB 104. UE2 is located in another, neighboring cell, and is within the neighboring overage area 112 of a neighboring eNB.

It has been discovered that timing and/or frequency synchronization between devices can be provided by a synchronization signal, a D2DSS, on an uplink (UL) channel in a UL resource or resource space, and that such uplink synchronization can be broadcast by a synchronization source to advertise, or alert other UEs to, the availability of a cluster. The UL resource is a set of frequencies which is designated for transmissions from UEs. It should be understood that the UL resource comprises a time domain, where the different data, frames or signals are transmitted in different time slots or sequentially in time. A UE or eNB transmits a synchronization signal in the UL resource so that other UEs can detect the synchronization signal. Synchronization signals in the uplink resource provide greater accuracy than synchronization on a downlink (DL) channel or synchronization with an eNB's 104 primary synchronization signal (PSS) or secondary synchronization signal (SSS). The uplink synchronization signal permits decoupling of the D2D synchronization signal (D2DSS) from an eNB synchronization signal and greater control over timing than using the eNB PSS. The generation of the D2DSS is, in different embodiments, determined by the relationship of the synchronization source or UEs 106 and 108 to the eNB 104.

In an in-coverage embodiment, the D2DSS is a separate signal transmitted within the uplink signal resources and that is synchronized with, or otherwise based on, the SSS. It has been discovered that the time synchronization to the eNB 104 in the downlink resources may only provide a very coarse time synchronization to support the D2D communication on the uplink. A separate D2DSS in the UL resource or on the UL channel provides greater control and accuracy for synchronization between devices while avoiding interference between individual devices and the eNB. Additionally, in some embodiments, the eNB may provide synchronization for the in-coverage UEs 106 by transmitting a D2DSS in the DL resource as a backup or secondary D2DSS. In such an embodiment, the UEs may switch to a D2DSS in the UL resource, for example, when one of the UEs leaves the coverage area 102, when the eNB determines that resources at the eNB are low, when the DL fails to provide suitably accurate synchronization timing, or under other conditions.

For asynchronous eNB deployment, UEs in one cell wanting to communicate with UEs in another cell listen to the PSS/SSS of the neighbor cell, which may not always be practical. Accordingly, an embodiment provides an uplink (UL) synchronization signal for better coarse or even fine synchronization, simple timing maintenance, and for creating clusters based on proximity.

For example, an active UE 106 and 108 maintains two uplink timings: one for cellular transmission (an earlier transmission with timing advance (TA) adjustment) and one for D2D communication (a later transmission aligned with cellular downlink (DL)). The two timings could be problematic when the UE receives a D2D subframe after a scheduled time for transmitting a cellular subframe (earlier one) if the D2D subframe is intended to be retransmitted in the cellular subframe. Note that the UE cannot transmit the cellular and D2D package in one subframe due to the timing difference and single carrier transmission, as the complexity involved in scheduling to avoid such timing conflicts imposes unacceptable and unworkable restrictions and requirements on the scheduler.

A common solution for all scenarios can be targeted to keeping the D2D UE functionality as simple as possible, with a UE configured to execute a single process to join or create a cluster regardless of the UE's location inside or outside of an eNB's coverage area. The UE forms or joins a cluster through one of several different ways. In some embodiments, the UE joins an existing cluster by discovering a D2DSS in the uplink resource, and then joining the cluster by synchronizing communications with the synchronization source using that D2DSS. The UE can then communicate with other devices in the cluster using a communications link synchronized with the D2DSS. In other embodiments, the network initiates the formation of a cluster and instructs the UE to form a cluster by transmitting a D2DSS in the uplink resource. Such network control of the cluster formation is initiated without the UE explicitly requesting permission to become a synchronization source. In other embodiments, the UE sends a request to the eNB for permission to form a cluster. The eNB may grant permission to act as a synchronization source, after which the requesting UE transmits a D2DSS which other UEs may use to join the requesting UE's cluster. In some situations, the eNB may deny the UE's request to create a cluster, after which the UE may join a cluster having a priority or status that was unacceptable to the UE prior to being denied permission to form a cluster. In yet other embodiments, the eNB provides a synchronization signal, in effect, acting as a synchronization source for devices within the eNB's coverage area In order for UEs to communicate, a reception UE has to obtain the timing and frequency reference of the transmission UE. In case of in-coverage UEs (see FIG. 1D), a base station such as eNB can provide a common timing by downlink Rel-8 Primary synchronization signal/Secondary synchronization signal (PSS/SSS) for UEs camping inside its coverage and accordingly be the synchronization source for the UEs. While for inter-cell cases (see FIG. 1E), UE1 in a cell with coverage area 102 provided by serving eNB 104 that wants to communicate with UE2 in a neighboring cell with coverage area 104 provided by serving eNB 110 needs to listen to the PSS/SSS of the neighboring cell, which may not always be practical because UE1 is not within the coverage area 112 for the neighboring cell. For partial-coverage cases (see FIG. 1C), the out-of-coverage UE2 is unable to correctly receive the PSS/SSS from the eNB 104.

Figure 1F:
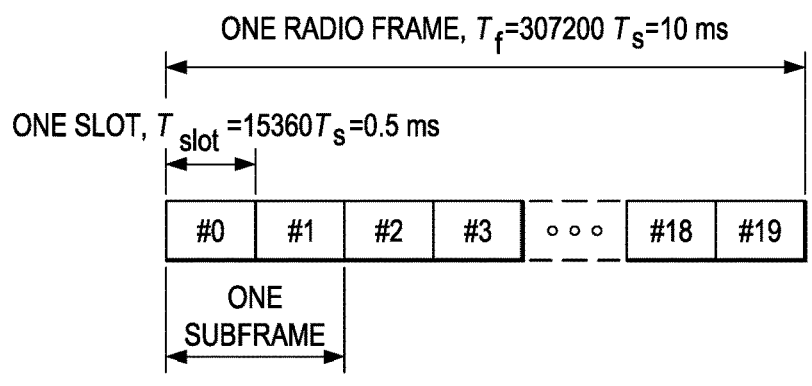
FIG. 1F illustrates a frame structure according to an embodiment.

FIG. 1F illustrates a frame structure according to an embodiment. The frame structure is applicable to both full duplex and half duplex Frequency Division Duplexing (FDD). Each radio frame is $T_f=307200$ and $T_s=10$ ms long and consists of 20 slots of length $T_{slot}=15360$ and $T_s=0.5$ ms long, with the slots numbered from 0 to 19. A subframe is defined as two consecutive slots where subframe i consists of slots 2i and 2i+1. For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time while there are no such restrictions in full-duplex FDD. One subframe is the minimum granularity for configuration or scheduling. In some systems for Orthogonal Frequency Division Multiplexing (OFDM) and for Single-carrier Frequency-Division Multiple Access (SC-FDMA), there are 14 symbols in each subframe on the uplink. One symbol is the minimum granularity for time resource occupation. Radio frames are numbered from 1 to 1023 sequentially and the numbers corresponding to each radio frame are called System Frame Number (SFN). The following methods and apparatuses described apply to FDD, half-duplex FDD, Time Division Duplexing (TDD) and the like.

Figure 2:
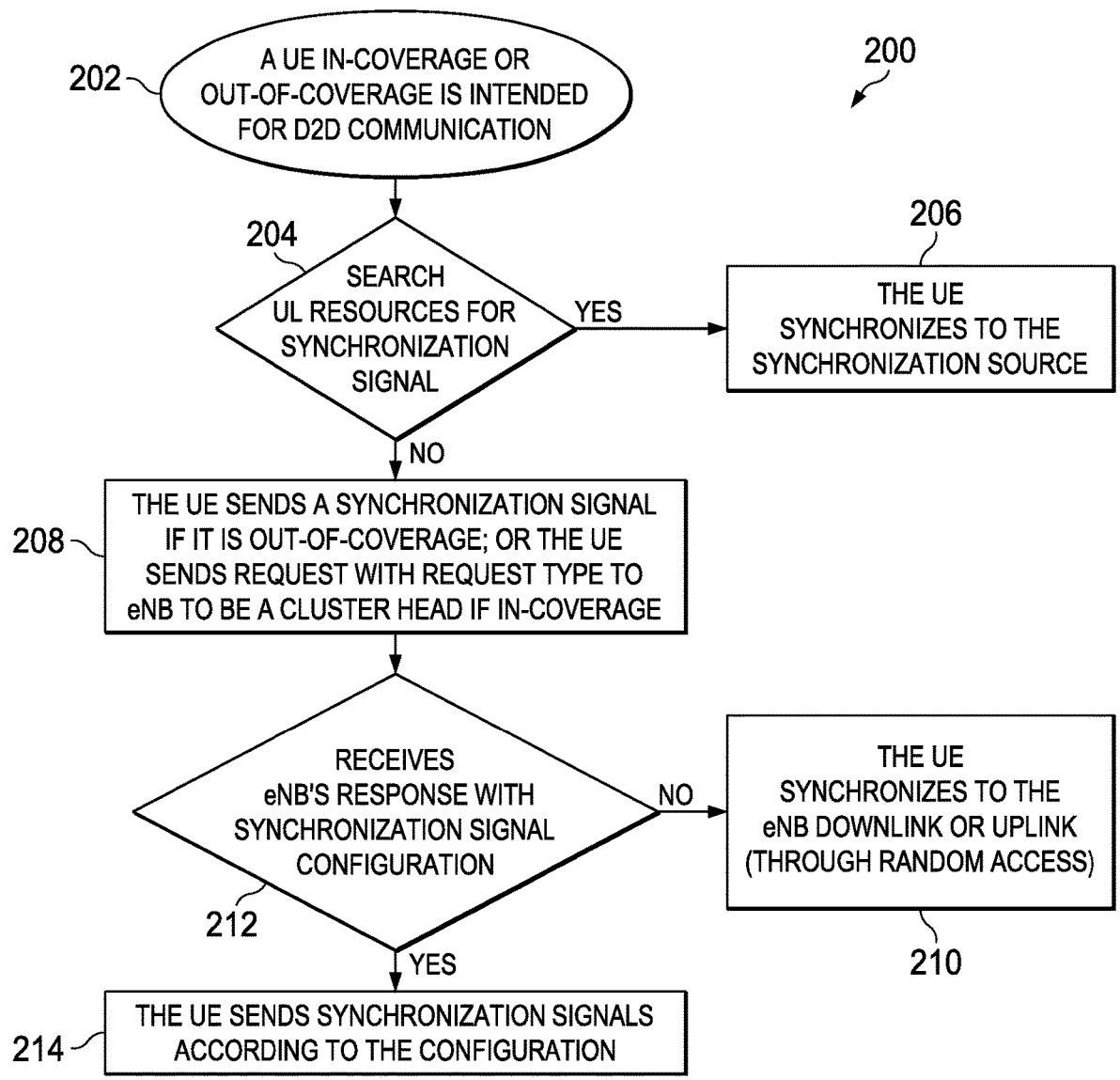
FIG. 2 illustrates a flow diagram of process for a UE to provide an uplink (UL) synchronization signal for D2D discovery and communication according to some embodiments.

FIG. 2 illustrates a flow diagram of a process for a UE to provide an UL synchronization signal for D2D discovery and communication according to some embodiments. Initially, in block 202, a UE attempts D2D communication. In some embodiments, the D2D communication is initiated automatically by the UE, for example, upon powering on the UE or startup of an operating system or application, connection of an external device or the like. In other embodiments, the UE initiates D2D communication in response to a user action, for example, when a user explicitly requests D2D communication, or when a user attempts to communicate with another UE that is known or assumed to be available for D2D communication.

In block 204, the UE searches uplink resources for a D2DSS. The UE searches through the uplink resource frequencies and in the time domain for uplink transmissions that are transmitted by other UEs to determine if another UE is already acting as a synchronization source and transmitting a D2DSS signal. In some embodiments, the UE receives and decodes uplink data frames on one or more subcarriers, frequencies, time slots, or the like. In some embodiments, the UE has a pre-set D2DSS search window defined as a result of an instruction from an eNB, and in other embodiments, the D2DSS search window is associated with a particular D2D target or group. For example, a UE may be set to communicate with multiple, separate groups, with each group having its own synchronization parameters, including a location for the D2DSS signal. In another example, the eNB may identify for the UE a particular uplink resource subframe or location in the uplink resources where a D2DSS may be found. The eNB may send a message to the UE describing a search location or resource range for the UE to search for a D2DSS with the UE's uplink resource. In some embodiments, the eNB may transmit an instruction to an in-coverage UE indicating the location or range where a D2DSS of a neighboring cell will be located in the uplink resource. The instruction may include, in some embodiments, a location and search window width w1 and/or w2 for the given neighboring cell. The UE can then focus on the window of frequencies centered at the location or offset transmitted in the instruction by the eNB. In an embodiment, w1 may be a fixed value and w2 may be dynamically determined by the network layer or by the eNB. Additionally, the width of w2 may be less than a guard period or cyclic prefix (CP) for the symbols in each subcarrier. The UE, for the purposes of discovery, searches the uplink resource with a search window of +/=w1 milliseconds and/or +/−w2 milliseconds for a D2DSS form the neighboring cell or from another UE.

For example, the instruction may have a synchronization offset indicator (synchOffsetIndicator_{i}) that indicates the offset within a system frame number (SFN) cycle for a synchronization signal transmitted by a neighboring cell. In some embodiments, the start of the synchronization period is with respect to SFN 0 of the serving cell, with the offset indicating the time, frequency, or data location (bit count) offset. Such a parameter may be relevant to resources of neighboring cells. Additionally, the instructions may have a discovery synchronization window (discoverySynchWindow_{i}) that indicates a sliding window over which a UE should expect that D2DSS or discovery resources indicated by the pool configuration. Such a parameter may be relevant to resource pools of neighboring cells.

The UE searches received communications in the uplink resource to determine if a usable D2D synchronization signal is present. In some embodiments, the UE determines whether the D2DSS is usable by determining whether the D2DSS is associated with a D2D communication group, network contact, or the like. For example, a public service UE such as a police group UE may receive D2DSSes for multiple different communications groups, but may reject D2DSSes associated with fire or EMS communications groups as unusable, while accepting a D2DSS associated with a police communications group as usable. In some embodiments, when the UE determines that no suitable D2DSSes exist in the uplink resource, the UE switches to the downlink resource to search for D2DSSes. In other embodiments, the UE may determine that the UE has a higher priority than the synchronization sources of existing clusters, and may request to create a new cluster or become a synchronization source.

If the UE finds a usable D2DSS, then the UE synchronizes with the synchronization source UE transmitting the D2DSS in block 206. The UE, in some embodiments, then initiates direct device-to-device communication with the synchronization source UE or with other UEs in the cluster.

If the UE finds no usable D2DSSes, the UE attempts, in block 208, to become a synchronization source in block 208 by transmitting a D2DSS if the UE is out-of-coverage, or by requesting permission from, and receiving synchronization source transmission parameters from an eNB. For example, an out-of-coverage UE may determine that no eNB signals are detected and that no suitable D2DSSes are detected, indicating that there are no existing or available clusters. The UE may then determine to act as a synchronization source. In case of out-of-coverage UEs, a synchronization source is selected from available UEs according to some criteria (e.g., the order of presence, the grade of a node, etc.) to periodically send a synchronization signal on the uplink as a synchronization reference. In such an example, the synchronization source UE transmits a D2DSS using transmission parameters, such as power, frequency, periodicity or UL subframe location, that may be selected randomly, preconfigured, or otherwise determined by the synchronization source UE. For example, the first UE can transmit the synchronization signal for another UE to later join. Thus, the synchronization and cluster creation are fulfilled at the same time. If a UE of higher priority joins, it could take over the reference position by sending a new synchronization signal in the uplink space for UEs in its coverage to follow.

UEs intended for D2D communication first search for uplink synchronization signals, and if a UE fails to detect any uplink synchronization signal, it requests in block 208 to be a synchronization source and send an uplink synchronization signal to form a cluster. In some embodiments, the UE may detect uplink synchronization signals transmitted by UEs of a lower power or priority. In such embodiments, the UE may send a request to the eNB to become a synchronization source even though other clusters or synchronization sources exist. In such a scenario, should the eNB grant the request, the requesting UE may broadcast the synchronization signal, or be instructed to take over a cluster or transmission of the D2DSS from a lower priority UE synchronization source by joining the cluster and negotiating the takeover of the cluster with the existing synchronization source. In some embodiment, a UE that is out-of-coverage may indicate that it requests cluster coverage from an in-coverage UE by transmitting a low priority D2DSS. An in-coverage UE detecting the lower priority D2DSS may then send a request to the eNB to become a synchronization source.

The UE sends a request to the eNB for a right or permission to send D2DSS on the uplink resources. The request message may include a priority level and request type. The request type may indicate that a synchronization signal is detected but it is lower than the requesting UE's priority, it may indicate that no synchronization signal was detected, it may indicate another status of synchronization signals received by the UE, or the request type may be omitted. The request can be triggered by a higher layer due to its higher priority, where it sends the request with request type for the eNB. Alternatively, in an embodiment, where the UE detects a lower priority synchronization signal such as an out-of-coverage synchronization signal, the UE may sends the request with request type for the eNB to form a partially-in-coverage cluster.

The eNB receives a request to become a synchronization source from an in-coverage UE. As described in greater detail below with respect to FIG. 3, the eNB determines whether the UE can or should become a synchronization source and transmits a response to the requesting UE.

In block 212, the requesting UE receives an eNB message regarding becoming a synchronization source. In an affirmative response to a cluster request message, one or more in-coverage UEs are designated by the eNB to act as synchronization sources and send synchronization signals on the uplink resources. In some embodiments, the eNB transmits parameters for transmission of the D2DSS. For example, the eNB may determine that the UE should form the cluster using a particular power limit for the cluster, using a particular transmission power for the D2DSS, or using particular uplink resources, frequencies or the like.

The eNB configuration message may include cluster transmission parameters such as the transmit power of the synchronization signal, which is set by the eNB to manage interference and the cluster coverage. It also may include parameters of the resource for the synchronization signal, including frequency, periodicity, etc. For clusters that are out-of-coverage, if no interference will be generated to (partially) in-coverage clusters, then the UEs can transmit at maximum power. Alternatively, a predefined transmit power also can be used to meet the interference requirement of most cases. In some embodiments, the eNB may determine the location, and distance of clusters, or the proximity of clusters, and adjust the transmit power or other parameters for the clusters accordingly.

In other embodiments, the eNB may transmit an affirmative response to the UE's request to become a synchronization source without any synchronization signal transmission parameters. In such an embodiment, the UE may use a preset configuration, a random configuration, or may receive transmission parameters from other sources. If the D2DSS in the UL resource is successfully detected, UEs associated to a first eNB (eNB 1) can join a cluster nearby whose synchronization source is associated to a different eNB (eNB 2). Additionally, UEs at the edge of an eNB can join multiple clusters for direct communication, though each communication is synchronized with respect to a single reference.

In an alternative embodiment, such as in time division duplexing (TDD), the eNB transmits an additional reference on the UL and then the eNB acts as a synchronization source. In some embodiments, the configuration of this synchronization source can be a default configuration. In an alternative embodiment, a UE either synchronizes to an UL synchronization signal or follows the DL timing from the eNB.

Alternatively, the UE may be subjected to network control, where the UE receives an explicit instruction from the eNB that the UE should look for a local cluster synchronization signal. Thus, the UE may receive a response from the eNB that the UE is not authorized to create a new cluster, and that the UE should join an existing cluster. This effectively overrides the requesting UE's priority, since a UE may be instructed to join a cluster where the synchronization source has a lower priority than the requesting UE.

A partially-in-coverage cluster formed by UEs that could possibly interfere with each other would eliminate the interference between the network and D2D communication if the cluster is synchronized to the eNB. Because the out-of-coverage UEs are not able to correctly receive an eNB's signal, an in-coverage UE should behave as the synchronization source/cluster head by sending a synchronization signal for other UEs in the partially-in-coverage cluster to follow. As a result, one or some UEs in coverage need to have the ability and privilege to be synchronization source in order to manage the potential interference at the coverage boundary. However, an eNB may not know clearly which potential UE is located close to its coverage boundary, not to mention the existence of out-of-coverage UEs.

In an embodiment, the eNB may indicate a particular location in an uplink resource to search for a synchronization symbol. The eNB, or a higher layer may indicate that a synchronization symbol is located in a particular uplink resource subframe and describe a search window location with width w1 and/or w2 for a given neighbor cell. The UE, for the purposes of discovery, searches in the identified location of the uplink resource with a search window of +/−w1 milliseconds or +/−w2 milliseconds. Since the location and search window for searching the uplink resources is transmitted by the eNB, the UE assumes that the neighboring cell transmits the D2DSS in the indicated location.

In another embodiment, some UEs in coverage are designated by the eNB to send synchronization signals on the uplink resources for potentially partially-in-coverage D2D communication. Because the designated synchronization source may only know it is configured to send an uplink synchronization signal, the configuration may be similar to that for an out-of-coverage cluster.

When the UE sends the request to be a synchronization source to its eNB, the eNB may deny the UE request to be a synchronization source and, in block 210, the UE synchronizes with the eNB downlink or uplink synchronization signal. In some embodiments, the UE initially attempts to synchronize with the eNB uplink synchronization signal, and if the uplink synchronization signal is unavailable, insufficient, or otherwise unsuitable, the UE may subsequently attempt to synchronize with the eNB downlink synchronization signal, the SSS, the PSS or another eNB synchronization signal.

Alternatively, the UE may not receive a response from the eNB within a predetermined period of time, and may treat the lack of a response as if the eNB had responded negatively. In such an embodiment, the UE may synchronize with the eNB by random access, synchronizing with the eNB and then using that synchronization as the basis for D2D discovery or communication. In another embodiment, the UE may prioritize its use of nearby synchronization sources that are authorized by the eNB or that are out-of-coverage and independently acting as a synchronization source. For example, the eNB may deny a UE's request to become a synchronization source because only a limited number of synchronization sources are allowed for interference management and the requesting UE would exceed the number of synchronization sources if the request were granted. Such an attempt by the requesting UE to become a synchronization source or join the eNB-controlled cluster may be prohibited to guarantee cellular communication. In such a scenario, the UE may attempt to join an existing cluster even though the cluster parameters were initially determined to be unsuitable.

If the eNB grants the UE the right to act as a synchronization source, the UE sends the D2DSS in block 214. In an embodiment where the eNB transmits a configuration message to the UE, the UE generates a synchronization signal in the uplink resource that implements the instructions or rules from the configuration message.

Figure 3:
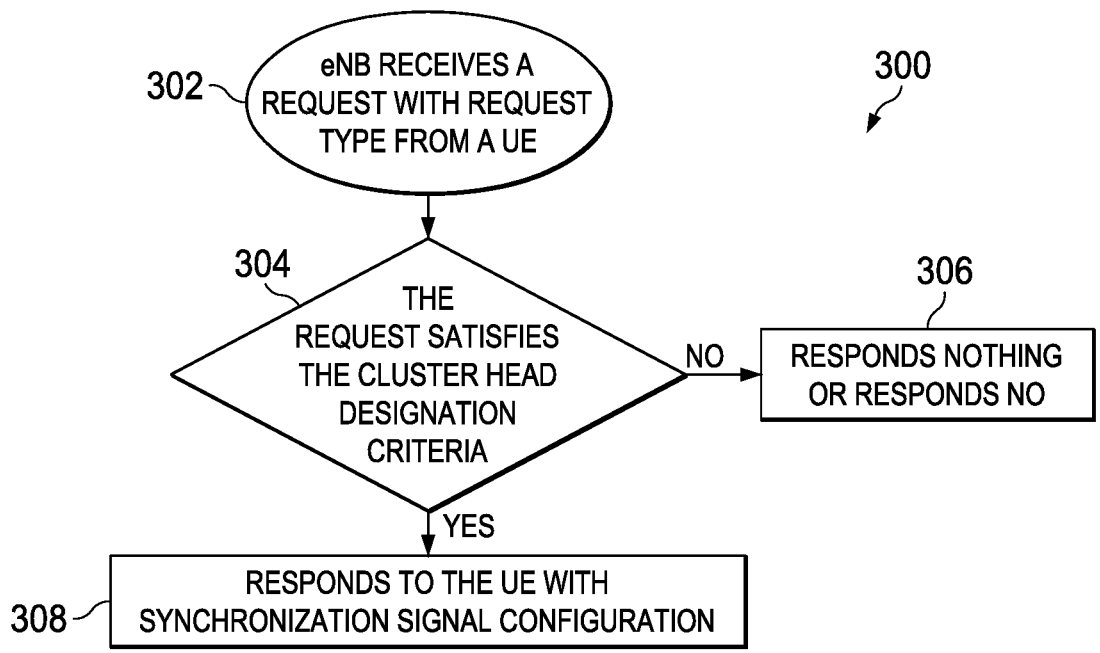
FIG. 3 illustrates a flow diagram of a process for an eNB to respond to a UE synchronization source request according to some embodiments.

FIG. 3 illustrates a flow diagram of a process 300 for an eNB to respond to a UE synchronization source request according to some embodiments. In block 302, the eNB receives a request from a UE for the UE to become a synchronization source. The request message may include a priority level and a request type, as described above. In block 304, the eNB determines whether the UE and request satisfy criteria for becoming a synchronization source. For example, the eNB may examine the order of the UE's presence compared to other UEs, the grade or priority of the UE or the cluster the UE would create, the number of existing UEs, the availability of other clusters, the possibility for interference with other UEs or clusters, the availability of resources in the air interface or on the network, authorization of the UE or user to create clusters, or other criteria.

If the eNB determines that the UE is permitted to form a cluster or become a synchronization source, the eNB sends an affirmative message indicating the permission in block 308. In some embodiments, the eNB generates a synchronization signal configuration message such as that described above. Alternatively, if the eNB determines that the UE is not permitted to form a cluster, the eNB, in block 306, responds to the UE with a message denying permission to form a cluster. Such a denial message may include instructions on joining or discovering other existing clusters. Alternatively, the eNB sends no message in response to the UE's request, which the UE interprets as denial of permission to form a cluster.

Figure 4:
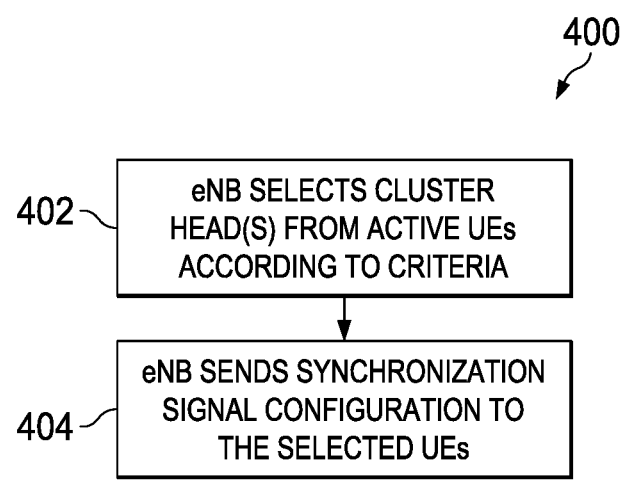
FIG. 4 illustrates a flow diagram of a process for an eNB to configure a synchronization source and synchronization signal according to some embodiments.

FIG. 4 illustrates a flow diagram of a process 400 for an eNB to configure a synchronization source and synchronization signal according to some embodiments. The eNB may track or keep records indicating which UEs are currently active in the eNB's coverage area. For example, the UEs may, in come embodiments, be in communication with the eNB through a radio resource control (RRC) protocol layer. The eNB then selects synchronization sources from the active UEs in the coverage area. Thus, the eNB can manage the number and coverage of clusters based in the coverage area as UEs enter and exit the coverage area. In some embodiments, the creation of clusters is controlled by the network instead of the UE initiating the cluster creation. In such a situation, the eNB designates a UE as a synchronization source prior to the UE requesting to become a synchronization source. A signal may be transmitted to the UE to initiate transmission of the D2DSS to, for example, provide synchronization signals to out-of-coverage UEs, and form partially in-coverage clusters. In an embodiment, the eNB controls a UE to become a synchronization source. In such an embodiment, the UEs are in communication with the eNB by way of RRC connections, and the eNB may send the command to transmit the D2DSS, and any related configuration information or message, by RRC-dedicated signaling. Thus, a single selected UE can be controlled by the eNB to transmit a synchronization signal and become a synchronization source. In another embodiment, the eNB controls multiple UEs to become synchronization sources. In such an embodiment, the UEs are in communication with the eNB by way of RRC, and the eNB may send the command to transmit D2DSS, and any related configuration information or message, by RRC-broadcast signaling. Thus, multiple UEs can be controlled by the eNB to transmit synchronization signals and become synchronization sources.

In other embodiments, the eNB responds directly to a request to become a synchronization source from a UE. After designating a UE as a synchronization source, the eNB generates and sends the synchronization signal configuration message to the UEs designated to be synchronization sources. In embodiments where the eNB is responding to a UE that requested to be a synchronization source, the configuration message may be part of the response to the UE's request. In embodiments where the eNB designates a UE as a synchronization source as a result of network control and without the UE requesting to become a synchronization source, the synchronization signal configuration message is sent to the UE in a communication that is initiated by the eNB. In such a situation, the synchronization signal configuration message may be part of a command to broadcast the D2DSS and become a synchronization source.

Figure 5A:
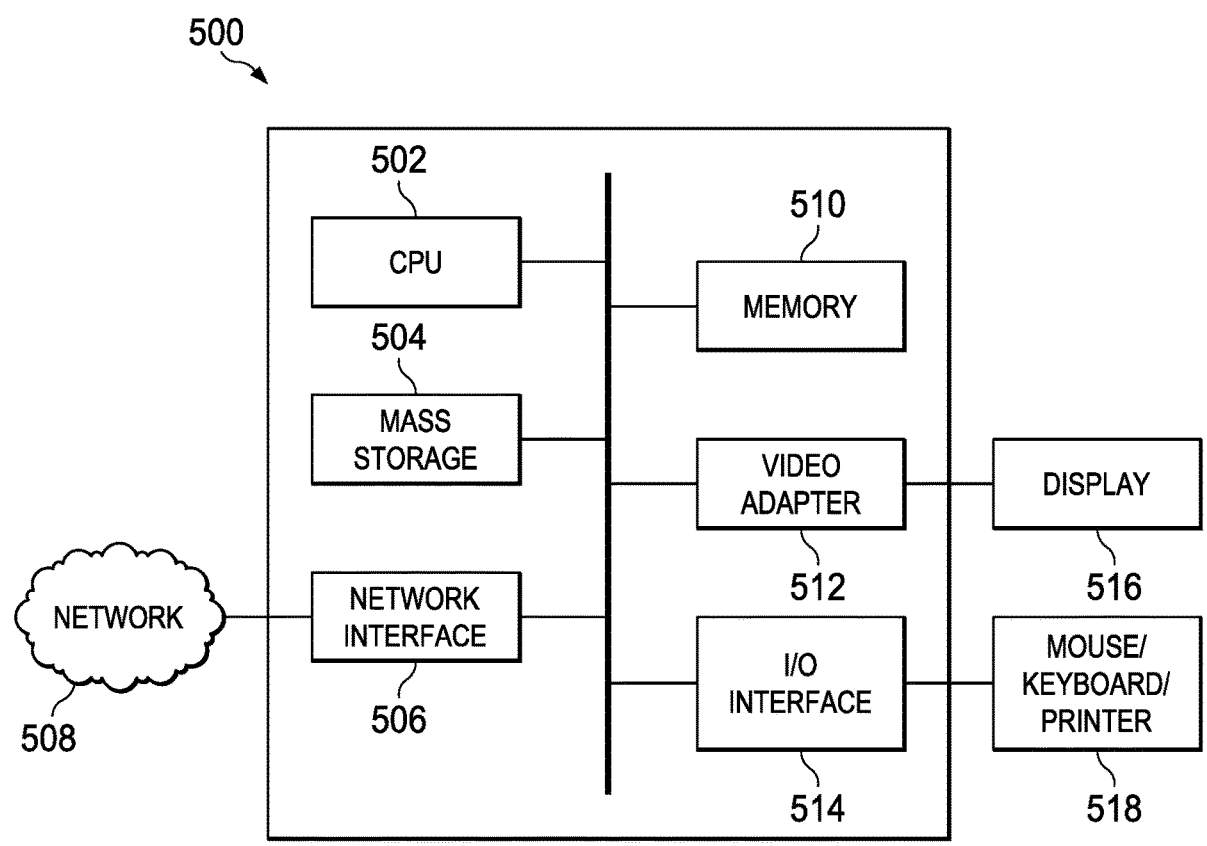
FIG. 5A illustrates a computing platform that may be used for implementing, for example, the devices and methods described herein, according to an embodiment.

FIG. 5A is a block diagram of a processing system 500 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit equipped with one or more input/output devices, such as a speaker, microphone, mouse 518, touchscreen, keypad, keyboard 518, printer 518, display 516, and the like. The processing unit may include a central processing unit (CPU) 502, memory 510, a mass storage device 504, a video adapter 512, and an I/O interface 514 connected to a bus.

The bus may be one or more of any type of several bus architectures including a memory bus or memory controller, a peripheral bus, video bus, or the like. The CPU 502 may comprise any type of electronic data processor. The memory 510 may comprise any type of nontransitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 504 may comprise any type of storage device configured to store data, programs, and other information in a nontransitory manner and to make the data, programs, and other information accessible via the bus. The mass storage device 504 may comprise, for example, one or more of a solid state drive, hard disk drive, a magnetic disk drive, an optical disk drive, or the like. Additionally, the mass storage device 504 may have stored thereon instructions to be executed by the CPU 502.

The video adapter 512 and the I/O interface 514 provide interfaces to couple external input and output devices to the processing unit. As illustrated, examples of input and output devices include the display 516 coupled to the video adapter 512 and the mouse/keyboard/printer 518 coupled to the I/O interface 514. Other devices may be coupled to the processing unit and additional or fewer interface cards may be utilized. For example, a serial interface such as Universal Serial Bus (USB) (not shown) may be used to provide an interface for a printer.

Figure 5B:
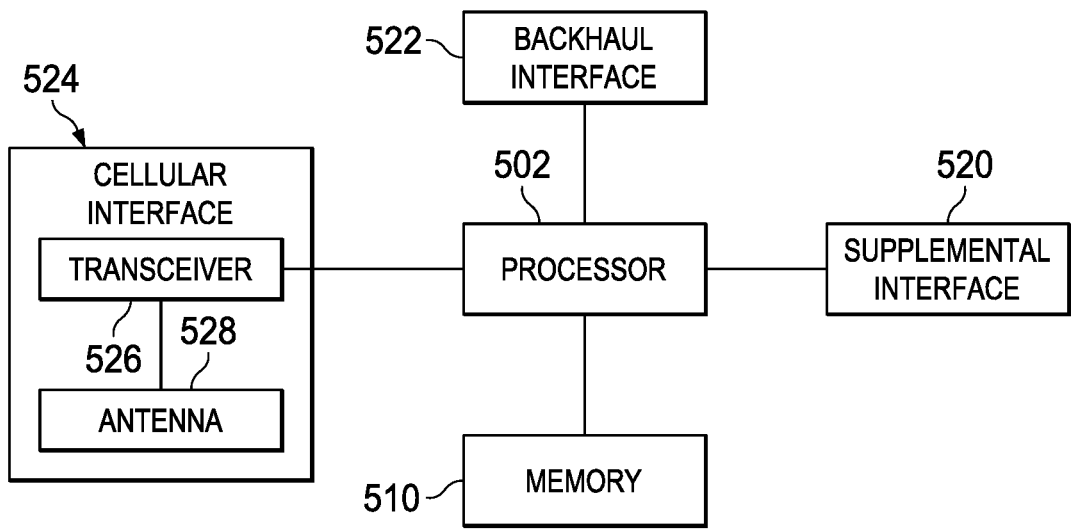
FIG. 5B illustrates a base station that may be used for implementing, for example, the devices and methods described herein, according to an embodiment.

The processing unit also includes one or more network interfaces 506, which may comprise wired links, such as an Ethernet cable or the like, and/or wireless links to access nodes or different networks 508. The network interface 506 allows the processing unit to communicate with remote units via the networks 508. For example, the network interface 506 may provide wireless communication via one or more transmitters/transmit antennas and one or more receivers/receive antennas. In an embodiment, the processing unit is coupled to a local-area network 508 or a wide-area network 508 for data processing and communications with remote devices, such as other processing units, the Internet, remote storage facilities, or the like. In other embodiments, the processing system 500 is a UE device communicating to a base station such as an eNB of a communications network 508 through a wireless network interface 506 such as a wireless transceiver. In other embodiments, the processing system 500 is a base station such as an eNB communicating to one or more UEs over a wireless network 508 through a network interface 506, such as a transceiver, or communicating to a larger communications network 508 by way of a network interface 506 such as a communications backplane, wired or wireless network, or the like. FIG. 5B is a block diagram of a base station that may be used in some embodiments for implementing the devices and methods disclosed herein. The base station may be equivalent to one or more devices (e.g., eNBs, etc.) discussed above. The base station may include a processor 502, a memory 510, a cellular interface 524, a supplemental interface 520, and a backhaul interface 522, which may (or may not) be arranged as shown in FIG. 5B. The processor 502 may be any component capable of performing computations and/or other processing related tasks, and the memory 510 may be any component capable of storing programming and/or instructions for the processor 502. The cellular interface 524 may be any component or collection of components that allows the base station to communicate using a cellular signal, and may be used to receive and/or transmit information over a cellular connection of a cellular network. In some embodiments, the cellular interface 524 may include a transceiver 526 formed in a single device, or alternatively, a separate receiver and transmitter. The cellular interface 524 may further have an antenna 528 in signal communication with the transceiver 526, which is in turn, in signal communication with the processor 502. The processor is configured to transmit or receive signals through the antenna 528 and transceiver 526. The supplemental interface 520 may be any component or collection of components that allows the base station to communicate data or control information via a supplemental protocol. For instance, the supplemental interface 520 may be a non-cellular wireless interface for communicating in accordance with a Wireless-Fidelity (Wi-Fi) or Bluetooth protocol. Alternatively, the supplemental interface 520 may be a wireline interface. The backhaul interface 522 may be optionally included in the base station, and may comprise any component or collection of components that allows the base station to communicate with another device via a backhaul network.

An embodiment base station includes a transceiver 526 configured to wirelessly communicate with UEs by RRC signaling and a processor 502 in signal communication with the transceiver 526. The processor 502 is configured to configure a first UE that is in an RRC_CONNECTED state with the base station to be a synchronization source and transmit a D2DSS. The processor 502 is further configured to configure the first UE to use an identified synchronization resource for transmission of the first D2DSS by the first UE, with the synchronization resource comprising a time resource or a frequency resource. In an embodiment, the processor 502 is further configured to receive, through the transceiver 526, a request from a second UE to become a synchronization source. The processor 502 is further configured to determine whether the second UE satisfies criteria for becoming a synchronization source and to transmit, through the transceiver 526, a reply to the second UE in response to the request, the reply generated according to the determining whether the second UE satisfies the criteria for becoming a synchronization source. In an embodiment, the processor 502 is further configured to transmit through the transceiver 526, to the second UE and in response to the second UE satisfying the criterial for becoming a synchronization source, transmission parameters for transmitting the D2DSS. The processor 502 is further configured to transmit, through the transceiver 526, to the second UE, and upon determining that the second UE fails to satisfy criteria for becoming a synchronization source, a command to join an existing cluster. In some embodiments, the RRC signal comprises an RRC dedicated signal, and in other embodiments, the RRC signal comprises an RRC broadcast signal.

Figure 5C:
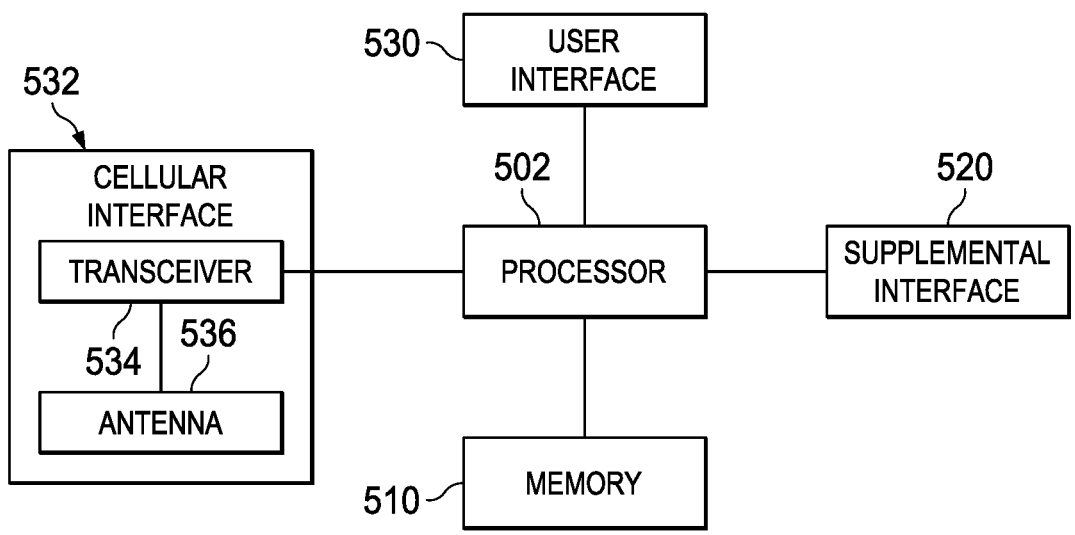
FIG. 5C illustrates a user equipment that may be used for implementing, for example, the devices and methods described herein, according to an embodiment.

FIG. 5C is a block diagram of a UE that may be used in some embodiments for implementing the devices and methods disclosed herein. The UE may be equivalent to one or more devices (e.g., eNBs, etc.) discussed above, and may be any user end device such as a cellular or satellite phone, personal communication device, computer, or the like. The UE may include a processor 502, a memory 510, a cellular interface 532, a supplemental interface 538, and a user interface 530, which may (or may not) be arranged as shown in FIG. 5C. The processor 502 may be any component capable of performing computations and/or other processing related tasks, and the memory 510 may be any component capable of storing programming and/or instructions for the processor 502. The cellular interface 532 may be any component or collection of components that allows the UE to communicate using a cellular signal, and may be used to receive and/or transmit information over a cellular connection of a cellular network. In some embodiments, the cellular interface 532 may include a transceiver 534 formed in a single device, or alternatively, a separate receiver and transmitter. The cellular interface 532 may further have an antenna 536 in signal communication with the transceiver 534, which is in turn, in signal communication with the processor 502. The processor is configured to transmit or receive signals through the antenna 536 and transceiver 534. The supplemental interface 538 may be any component or collection of components that allows the UE to communicate data or control information via a supplemental protocol. For instance, the supplemental interface 538 may be a non-cellular wireless interface for communicating in accordance with a Wireless-Fidelity (Wi-Fi) or Bluetooth protocol. Alternatively, the supplemental interface 538 may be a wireline interface. The user interface 530 may be optionally included in the UE, and may comprise any component or collection of components that allows interaction with, or control of the UE by a user, another device, or the like.

An embodiment user equipment includes a transceiver 534 configured to wirelessly communicate by RRC signaling and a processor 502 in signal communication with the transceiver 534. The processor 502 is configured to receive, through the transceiver 534 and from a base station serving the UE, a first configuration by RRC signaling, the first configuration instructing the UE to transmit a first D2DSS. The processor 502 is further configured to receive, through the transceiver 534 and from the base station, a second configuration by RRC signaling, the second configuration identifying a synchronization resource comprising a time resource or a frequency resource for transmitting the first D2DSS by the UE. The processor is further configured to transmit, through the transceiver 534, the first device D2DSS in an uplink resource according to the first configuration and the second configuration. In an embodiment, the RRC signaling comprises an RRC broadcast signal or an RRC dedicated signal. The processor 502 is further configured to request, through the transceiver 534, permission from the base station to transmit the first D2DSS. In an embodiment, the processor 502 is further configured to receive a reply through the transceiver 534 and from the base station, with the reply being in response to the requesting the permission to transmit the first D2DSS comprising a configuration for transmitting the first D2DSS. The processor 502 is further configured to transmit, through transceiver 534, the first D2DSS in an uplink resource and in response to the reply from the base station. In an embodiment, the processor 502 is further configured to search signals in an uplink resource received through the transceiver 534 to detect a second D2DSS. The UE has a first priority and the processor 502 is further configured to request permission, through the transceiver 534 and from the base station, to transmit the first D2DSS in response to detecting the second D2DSS having a second priority lower than the first priority.

An embodiment base station includes a transceiver 506 configured to wirelessly communicate with user equipments (UEs) within a first cell of the base station. The base station further includes a processor 506 in signal communication with the transceiver and a nontransitory computer readable storage medium coupled to the processor. The nontransitory computer readable storage medium 504 has stored therein instructions to determine a second UE in a neighboring second cell. The second UE provides a device-to-device synchronization signal (D2DSS) for a first UE within the first cell of the base station. The nontransitory computer readable storage medium 504 further has stored therein instructions to transmit, through the transceiver 506, a first message to the first UE indicating the second UE that will be providing the D2DSS and transmit, through the transceiver 506, a second message to a first UE indicating an uplink resource in which the first UE can expect to detect the D2DSS transmitted by a second UE. In an embodiment, the second message comprises an offset of a starting subframe in which the first UE can expect the D2DSS transmitted by the second UE. The starting subframe is within a synchronization period of the neighboring second cell and the offset is with respect to a system frame number 0 of the first UE's serving cell. In an embodiment, the second message further comprises a window size indicating a range from the offset in which the first UE can expect the D2DSS transmitted by the second UE.

Figure 6A:
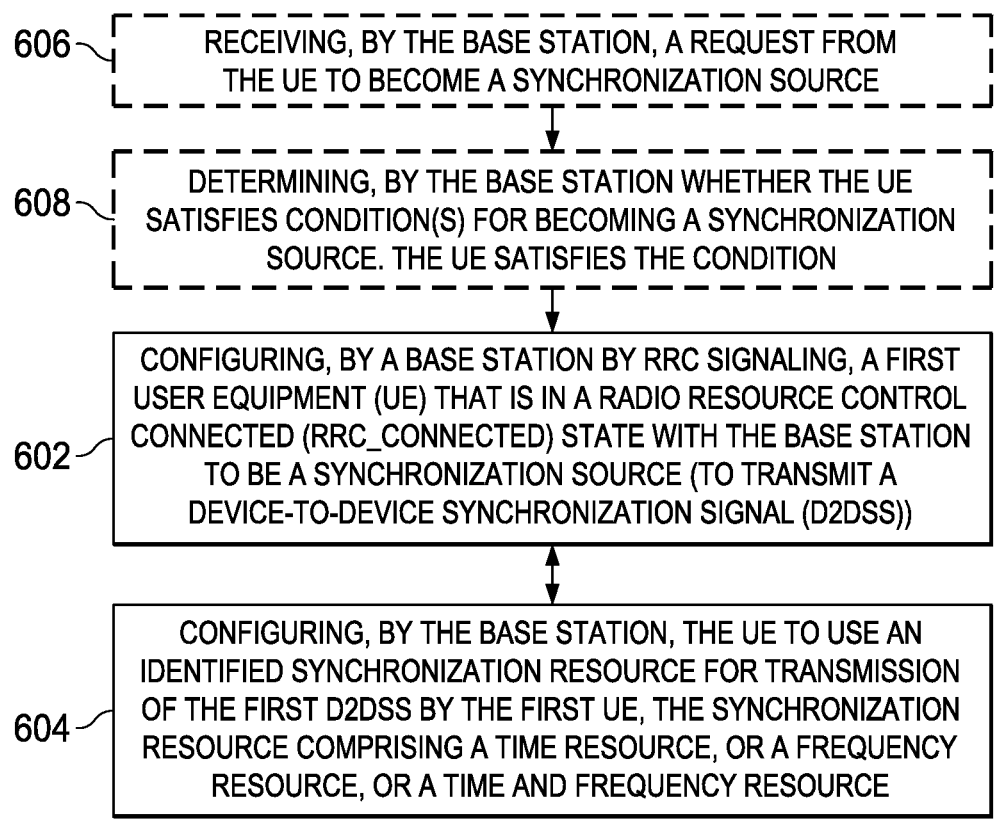
FIG. 6A illustrates a flow diagram of a process for a base station to configure a UE to be a synchronization source according to an embodiment.

FIG. 6A illustrates a flow diagram of a process for a base station to configure a UE to be a synchronization source according to an embodiment. A synchronization resource comprises a time domain such as, for example, a subframe or subframes containing a symbol(s) of a synchronization signal. A synchronization resource comprises a frequency domain such as, for example 6 physical resource blocks (PRBs) in the frequency domain for transmission of a synchronization sequence such as a D2DSS sequence. In an embodiment, in block 602, base station configures a UE that is in radio resource control connected (RRC_CONNECTED) state with the base station to be a synchronization source to transmit a device-to-device synchronization signal (D2DSS), by an RRC signaling transmitted by the base station. In block 604, base station configures, by an RRC signaling transmitted by the base station, a synchronization resource for the UE, with the synchronization resource comprising a time resource, a frequency resource or a time and frequency resource on the uplink for transmission of D2DSS by the UE. In an embodiment, the base station configures the UE by RRC dedicated signaling. For example, 2 states of one bit may be used to indicate to the UE to start transmitting the D2DSS or to stop transmitting D2DSS. In another embodiment, the eNB configures UEs by RRC broadcast signaling, which can be received by UEs in RRC_CONNECTED state and in RRC_IDLE state. UEs in the RRC_CONNECTED state will start transmitting the D2DSS after the RRC broadcast signaling is received. In another embodiment, one or multiple conditions/criteria are indicated in the RRC broadcast signaling, and a UE in the RRC_CONNECTED state will start transmitting D2DSS if meeting the one or multiple conditions/criteria. In another embodiment, one condition or criterion may be a Reference Signal Received Power (RSRP) threshold. In such an embodiment, when the RSRP of received downlink signal of a UE in an RRC_CONNECTED state is lower than the RSRP threshold, the UE will start transmitting D2DSS.

In an embodiment, a D2DSS can be in the 6 central physical resource blocks (PRBs) of the uplink system bandwidth when it is transmitted by an in-coverage UE. A UE can transmit the D2DSS on the 6 central PRBs of the time resource configured by the eNB. A D2DSS may, in some embodiment, have fixed periodicity, which means a time resource containing the D2DSS will occur every period. For example, the synchronization periodicity can be 40 subframes (40 milliseconds), which means a subframe containing D2DSS symbol(s) will occur every 40 subframes. In such an example, the start subframe of the synchronization period is with respect to system frame number (SFN) 0 of the serving cell. In case of a 40 ms synchronization period, one value from a value range of $\{0,1, \ldots, 39\}$ with granularity of 1 subframe can be indicated to a synchronization source. The base station will configure an offset with a value range of $\{0,1, \ldots, 39\}$ within a synchronization period 40 subframes (each with length of 1 ms) to indicate a synchronization source(s) the start subframe of synchronization period. With the offset, a synchronization source can then determine the location of the subframe (start subframe of the synchronization period) containing D2DSS symbols to transmit the D2DSS in. Note that the configuring of blocks 602 and 604 can be performed in any order. In one embodiment, there may be at least 2 primary D2DSS (PD2DSS) symbols in the subframe configured for D2DSS transmission to obtain fine synchronization.

In one embodiment, before the eNB configures a UE to be a synchronization source, in the base station, in block 606 receives a request from the UE to become a synchronization source. In another embodiment, in block 608, base station determines whether the UE satisfies one or more conditions or criteria for becoming a synchronization source. The base station makes the determination on the request after the base station receives the request from the UE and before the base station configures the UE to be a synchronization source in response to the request. The reply to the request is generated according to the base station's determination of whether the UE satisfies the condition/criterion for becoming a synchronization source. If satisfied, the base station configures the UE to be a synchronization source in response to the request. In some situations, the eNB may deny the UE's request to be a synchronization source.

Figure 6B:
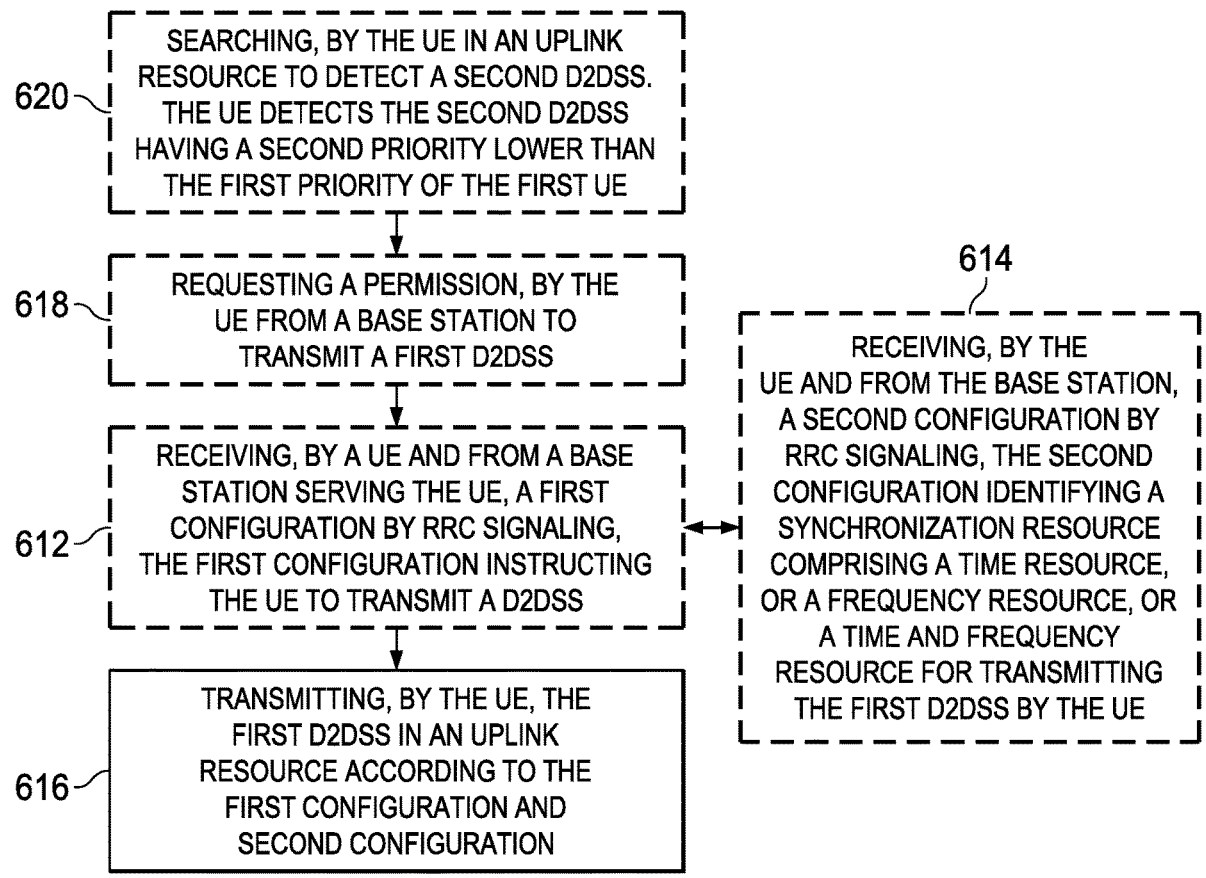
FIG. 6B illustrates a flow diagram of a process for a UE to be a synchronization source to transmit a first D2DSS according to an embodiment.

FIG. 6B illustrates a flow diagram of a process for a UE to be a synchronization source to transmit a first D2DSS according to an embodiment. In one embodiment, in block 612, a UE receives its serving base station's first configuration to be a synchronization source by RRC signaling. In block 614, the UE receives from its serving base station by RRC signaling, a second configuration identifying a synchronization resource comprising a time resource or a frequency resource or a time and frequency resource for transmitting the first D2DSS. In block 616, the UE transmits the first D2DSS according to the first configuration and second configuration. In an embodiment, the configuration information can be an offset indicating the start subframe of the synchronization period, which is with respect to system frame number (SFN) 0 of the serving cell. In the case of a 40 ms synchronization period, one value from a value range of $\{0,1, \ldots, 39\}$ with granularity of 1 subframe is configured to the UE by its serving base station to indicate the start subframe of synchronization period, and with the offset the UE can determine the location of the subframe (the starting subframe of the synchronization period) containing D2DSS to transmit D2DSS. In one embodiment, the transmission parameter(s) can be an offset indicating the start subframe of the synchronization period.

In an embodiment, in block 618, a UE requests permission from its serving base station to be a synchronization source. If the UE receives a positive reply from its serving base station in response to the request for the permission to be a synchronization source, in block 614, the UE transmits the D2DSS according to a second configuration of transmission parameter(s) indicated by its serving base station (614), for example, an offset indicating the start subframe of the synchronization period. In some situations, the base station may deny the UE's request to be a synchronization source.

In an embodiment, in block 620, before a UE requests permission from its serving eNB to be a synchronization source, the UE searches for a second D2DSS of lower priority than its own priority. For example, a D2DSS sent by out-of-coverage UEs may have a lower priority than D2DSS from in-coverage UEs. If a second D2DSS of lower priority is found, the UE sends request to its serving eNB to be a synchronization source.

For UEs in the RRC_CONNECTED state that are configured by its serving base station (cell) to be synchronization sources to transmit the D2DSSes, and the embodiments described above, for example, in the case of inter-cell coverage, it has been determined that better coarse and fine synchronization performance can be achieved than listening to the PSS/SSS of the neighbor cell, which may not always be practical. Additionally, UEs at a cell edge could receive multiple synchronization signals/join multiple clusters for D2D communication, though each communication of course would be with respect to a single reference. In case of partial-coverage arrangements, UEs in the RRC_CONNECTED state that are configured by a serving base station (cell) as a synchronization source transmitting a D2DSS for out-of-coverage UEs to follow form a partial-coverage cluster. The interference between the network and D2D communication is eliminated when the out-of-coverage UEs are indirectly synchronized to the network via the D2DSS sent by in-coverage UEs. Additionally, fine synchronization performance can be achieved by the D2DSS sent by in-coverage UEs. It should be noted that UEs configured to be synchronization sources only know that they are configured to be synchronization source to transmit D2DSS, and therefore there is no any differentiation or limitation for different cases or coverage arrangements.

Figure 7:
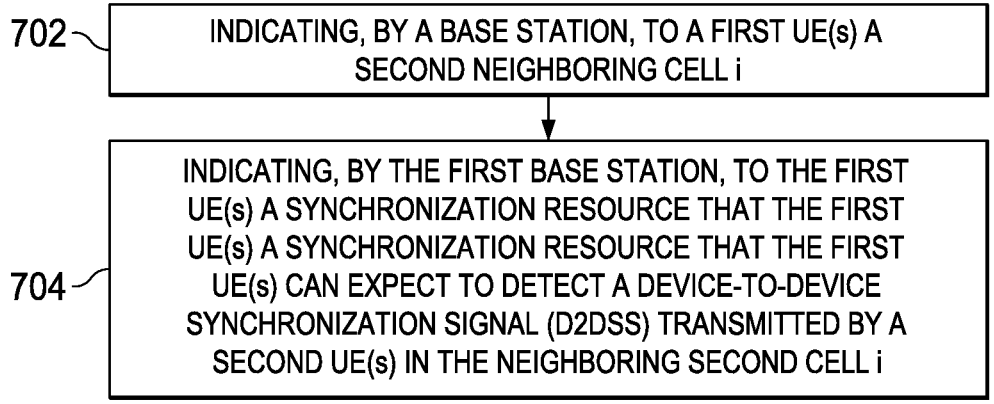
FIG. 7 illustrates a flow diagram of a process for a base station to indicate to a UE the synchronization resource of neighboring cells wherein a D2DSS may be found according to an embodiment.

FIG. 7 illustrates a flow diagram of a process for a base station to indicate to a UE the synchronization resource of neighboring cells wherein a D2DSS may be found according to an embodiment. In block 702, a base station comprising a first cell, indicates to a first UE(s) a neighboring second cell i. In block 704, the base station indicates to the first UE(s) a synchronization resource that the first UE(s) can expect to detect a device-to-device synchronization signal (D2DSS) transmitted by a second UE (s) in the neighboring second cell i.

In one embodiment, the indication comprises an offset of the start subframe containing D2DSS within the synchronization period of a neighboring cell i with respect to system frame number (SFN) 0 of the serving cell. For example, in the case of a 40 subframe (ms) synchronization period, one value from a value range of $\{0,1, \ldots, 39\}$ with granularity of 1 subframe can be indicated to the first UE(s). Using the offset with respect to the system frame number (SFN) 0 of the first cell indicated by the first base station, the first UE can roughly know the location of the subframe (start of the synchronization period) containing the D2DSS transmitted by the second UE(s) in neighboring second cell. The first UE(s) may be in RRC_CONNECTED state or in RRC_IDLE state.

In both a synchronous deployment case and asynchronous deployment case, the offset indicated by a base station may not give the first UE the exact start timing of the subframe containing D2DSS of the neighboring second cell. In case of synchronous deployment case, though cells can be viewed as synchronous, there still can be timing differences between the reception signals from different cells due to the different distances between a UE and cells. In an embodiment, the timing difference can be within Cyclic Prefix length of an OFDM symbol. In case of asynchronous deployment case, cells are generally viewed as asynchronous, and therefore there will generally be timing differences between reception signals from different cells. In an embodiment, since the offset is in the granularity of the subframe level, the timing difference can be within the duration of one subframe (with length of 1 ms) or 0.5 subframe.

In one embodiment, the indication further comprises a window size indicating a range from a location of the subframe (start of the synchronization period) containing a D2DSS transmitted by the second UE(s) in the neighboring second cell. The location of the subframe is indicated by the offset with respect to the system frame number (SFN) 0 of the first cell. There can be multiple window sizes, for example, with a size used for a synchronous deployment case, and a different size used for asynchronous deployment case.

Figure 8:
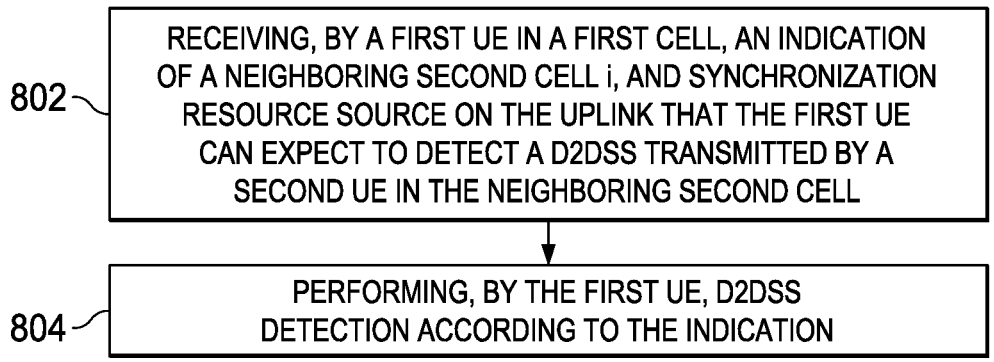
FIG. 8 illustrates a flow diagram of a process for a UE to detect a D2DSS from UEs in a neighboring cell according to an embodiment.

FIG. 8 illustrates a flow diagram of a process for a UE to detect a D2DSS from UEs in a neighboring cell according to an embodiment. In an embodiment, in block 802, a first UE receives from a base station comprising a first cell, the indication of a neighboring second cell i, and the synchronization resource that the first UE can expect to detect a device-to-device synchronization signal (D2DSS) transmitted by a second UE (s) in the neighboring second cell i. In block 804, the first UE performs D2DSS detection according to the indication from the base station. In one embodiment, the indication comprises an offset of the start subframe containing D2DSS within the synchronization period of the neighboring second cell i with respect to the system frame number (SFN) 0 of the first cell. For example, in the case of a 40 ms synchronization period, one value from a value range of {0,1, . . . , 39} with granularity of 1 subframe can be indicated to the first UE(s). Using the offset with respect to the system frame number (SFN) 0 of first cell indicated by the first cell, the first UE can roughly know the location of the subframe (start of the synchronization period) containing D2DSS transmitted by a second UE(s) in the neighboring second cell to receive. The first UE performs D2DSS detection according to the indication from the first cell.

In both a synchronous deployment case and asynchronous deployment case, the offset indicated by a base station may not give the first UE the exact start timing of the subframe containing D2DSS of the neighboring second cell. In case of synchronous deployment case, though cells can be viewed as synchronous, there still can be timing differences between the reception signals from different cells due to the different distances between a UE and cells. In an embodiment, the timing difference can be within Cyclic Prefix length of an OFDM symbol. In case of asynchronous deployment case, cells are generally viewed as asynchronous, and therefore there will generally be timing differences between reception signals from different cells. In an embodiment, since the offset is in the granularity of the subframe level, the timing difference can be within the duration of one subframe (with length of 1 ms) or 0.5 subframe.

In one embodiment, the indication further comprises a window size indicating a range from a location of the subframe (start of the synchronization period) containing a D2DSS transmitted by the second UE(s) in the neighboring second cell. The location of the subframe is indicated by the offset with respect to the system frame number (SFN) 0 of the first cell. There can be multiple window sizes, for example, with a size used for a synchronous deployment case, and a different size used for asynchronous deployment case. The first UE performs D2DSS detection according to the indication from the first cell.

The eNB indicating a UE the synchronization resource when and/or where the UE can expect to detect a device-to-device synchronization signal (D2DSS) transmitted by a UE (or UEs) in a neighboring cell and the related embodiments reduces a UE's processing complexity of reception/detection compared to completely blindly search for the D2DSS sent by UEs in a neighboring cell. Therefore a UE's power is saved and its battery life can be prolonged.

Figure 9A:
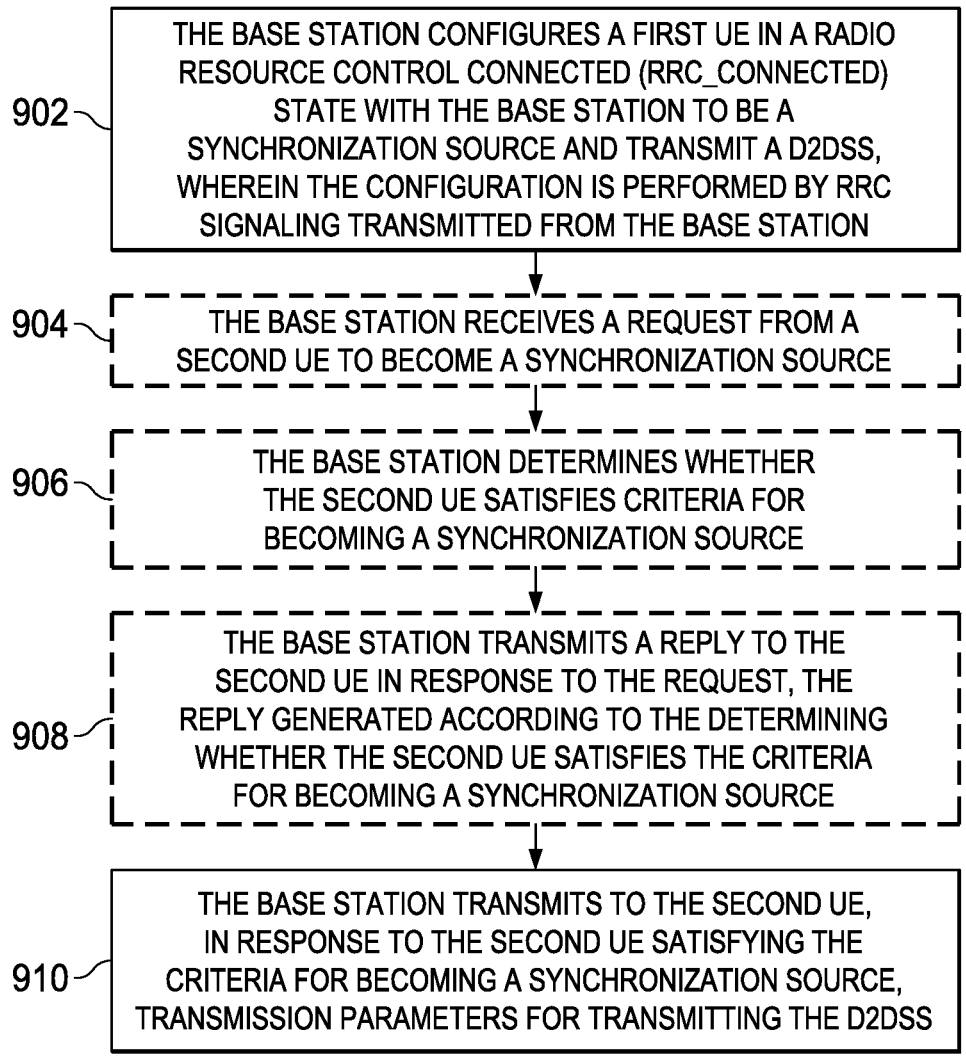
FIG. 9A illustrates a flow diagram for a base station configuring a UE in an RRC_CONNECTED state according to an embodiment.

FIG. 9A illustrates a flow diagram for a base station configuring a UE in an RRC_CONNECTED state according to an embodiment. A base station according to an embodiment has a processor and a nontransitory computer readable storage medium coupled to the processor having stored therein instructions for one or of:

902: Configuring a first user equipment (UE) in a radio resource control connected (RRC_CONNECTED) state with the base station to be a synchronization source and transmit a device-to-device synchronization signal (D2DSS). The configuration is performed by radio resource control (RRC) signaling transmitted from the base station.

904: Receiving a request from a second UE to become a synchronization source.

906: Determining whether the second UE satisfies criteria for becoming a synchronization source.

908: Transmitting a reply to the second UE in response to the request, the reply generated according to the determining whether the second UE satisfies the criteria for becoming a synchronization source.

910: Transmitting to the second UE, in response to the second UE satisfying the criterial for becoming a synchronization source, transmission parameters for transmitting the D2DSS.

Figure 9B:
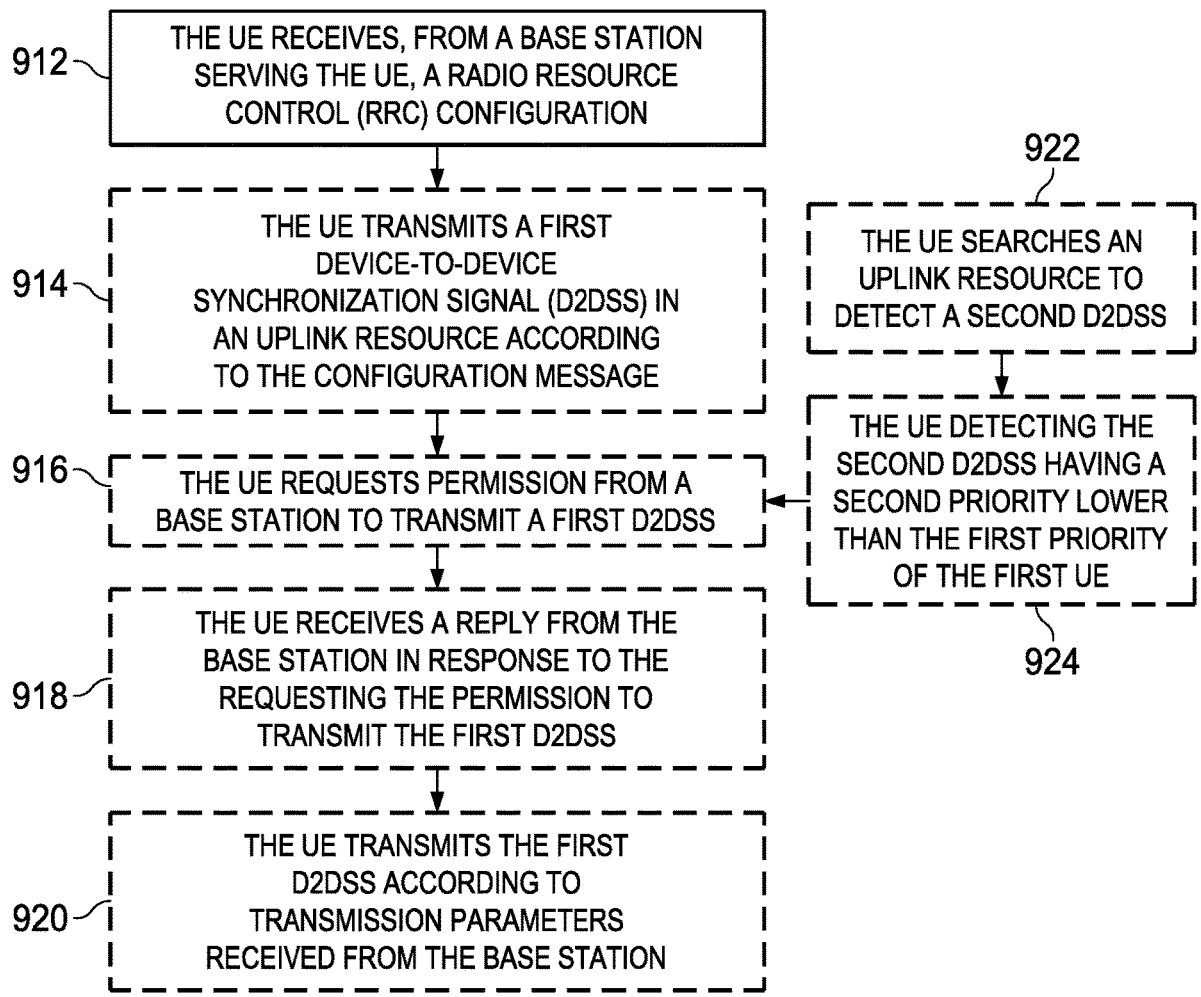
FIG. 9B illustrates a flow diagram for a UE in an RRC_CONNECTED state being configured to be a synchronization source according to an embodiment.

FIG. 9B illustrates a flow diagram for a UE in an RRC_CONNECTED state being configured to be a synchronization source according to an embodiment. A UE according to an embodiment has a processor and a nontransitory computer readable storage medium coupled to the processor having stored therein instructions for one or more of:

912: Receiving, from a base station serving the UE, a radio resource control (RRC) configuration message instructing the UE to be a synchronization source.

914: Transmitting a first device-to-device synchronization signal (D2DSS) in an uplink resource according to the configuration message.

916: Requesting permission from a base station to transmit a first device-to-device synchronization signal (D2DSS).

918: Receiving a reply from the base station in response to the requesting the permission to transmit the first D2DSS. The reply comprises a configuration for transmitting the first D2DSS.

920: Transmitting the first D2DSS according to transmission parameters received from the base station.

922: Searching an uplink resource to detect a second D2DSS.

924: Detecting the second D2DSS having a second priority lower than the first priority than the first UE.

Figure 10A:
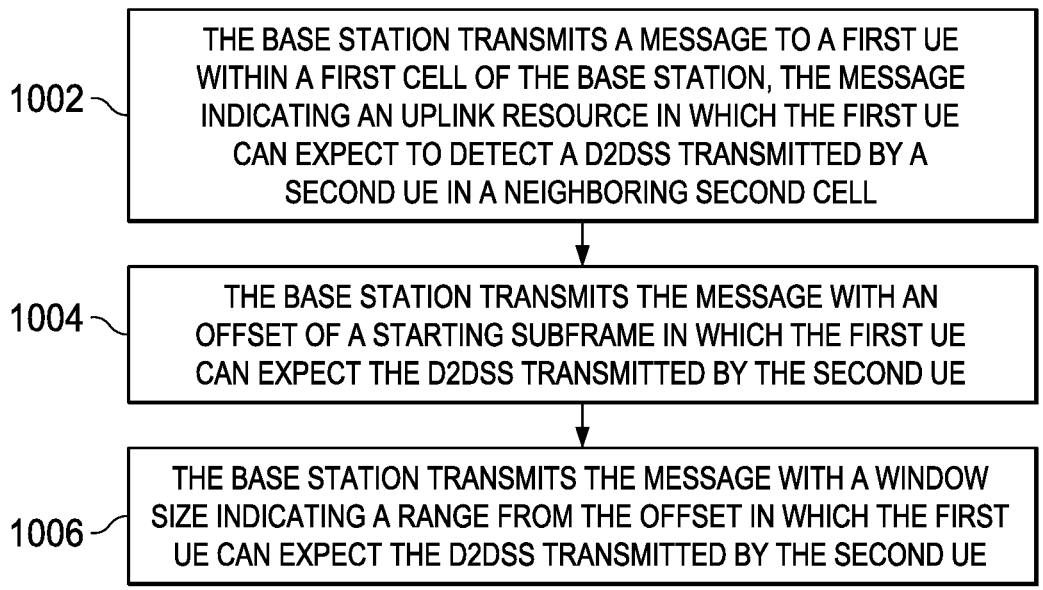
FIG. 10A illustrates a flow diagram for identifying, by a base station, an uplink resource where a UE can expect to detect a D2DSS according to an embodiment.

FIG. 10A illustrates a flow diagram for identifying by a base station a portion of an uplink resource where a UE can expect to detect a D2DSS according to an embodiment. A base station according to an embodiment has a processor and a nontransitory computer readable storage medium coupled to the processor having stored therein instructions for at least one of:

1002: Transmitting a message to a first user equipment (UE) within a first cell of the base station, the message indicating an uplink resource in which the first UE can expect to detect a device-to-device synchronization signal (D2DSS) transmitted by a second UE in a neighboring second cell.

1004: Transmitting the message with an offset of a starting subframe in which the first UE can expect the D2DSS transmitted by the second UE.

1006: Transmitting the message with a range from the offset in which the first UE can expect the D2DSS transmitted by the second UE.

Figure 10B:
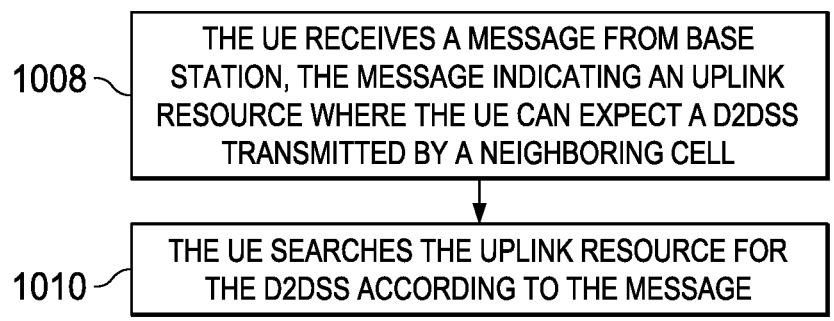
FIG. 10B illustrates a flow diagram for receiving, by a UE, identification of an uplink resource where the UE can expect to detect a D2DSS according to an embodiment.

FIG. 10B illustrates a flow diagram for receiving by a UE identification of a portion of an uplink resource where the UE can expect to detect a D2DSS according to an embodiment. A UE according to an embodiment has a processor and a nontransitory computer readable storage medium coupled to the processor having stored therein instructions for at least one of:

1008: Receiving a message from base station, the message indicating a uplink resource where the UE can expect a D2DSS transmitted by a neighboring cell; and 1010: Searching the uplink resource for the D2DSS according to the message.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving, by a user equipment (UE), first radio resource control (RRC) signal from a base station serving the UE, the first RRC signaling instructing the UE to transmit a first device-to-device synchronization signal (D2DSS);
receiving, by the UE, a second RRC signal from the base station, the second RRC signal identifying a synchronization resource for transmitting the first D2DSS by the UE, wherein the first RRC signal is received independently from the second RRC signal; and
transmitting, by the UE, the first D2DSS over the synchronization resource.

2. The method of claim 1, wherein the synchronization resource is a time resource.

3. The method of claim 1, wherein the synchronization resource is a frequency resource.

4. The method of claim 1, wherein the synchronization resource is a time-frequency resource.

5. The method of claim 1, wherein the first RRC signal and the second RRC signal are RRC broadcast signals.

6. The method of claim 1, wherein the first RRC signal and the second RRC signal are RRC dedicated signals.

7. The method of claim 1, further comprising:
requesting, by the UE, permission from the base station to transmit the first D2DSS.

8. The method of claim 7, further comprising:
searching, by the UE, an uplink resource to detect a second D2DSS, the UE having a higher priority than a device that transmitted the second D2DSS.

9. A user equipment (UE) comprising:
at least one processor; and
a non-transitory computer readable storage medium storing programming for execution by the at least one processor, the programming including instructions that cause the UE to:
receive first radio resource control (RRC) signal from a base station serving the UE, the first RRC signaling instructing the UE to transmit a first device-to-device synchronization signal (D2DSS);
receive a second RRC signal from the base station, the second RRC signal identifying a synchronization resource for transmitting the first D2DSS by the UE, wherein the first RRC signal is received independently from the second RRC signal; and
transmit the first D2DSS over the synchronization resource.

10. The UE of claim 9, wherein the synchronization resource is a time resource.

11. The UE of claim 9, wherein the synchronization resource is a frequency resource.

12. The UE of claim 9, wherein the synchronization resource is a time-frequency resource.

13. The UE of claim 9, wherein the first RRC signal and the second RRC signal are RRC broadcast signals.

14. The UE of claim 9, wherein the first RRC signal and the second RRC signal are RRC dedicated signals.

15. The UE of claim 9, wherein the programming further includes instructions to:
request permission from the base station to transmit the first D2DSS.

16. The UE of claim 9, wherein the programming further includes instructions to:
search an uplink resource to detect a second D2DSS, the UE having a higher priority than a device that transmitted the second D2DSS.

17. The method of claim 1, wherein the first RRC signal designates the UE as a synchronization source of a cluster of UEs in a coverage area of the base station, and wherein the synchronization resource identified in the second RRC signal is an uplink resource for transmitting the first D2DSS by the UE.

18. A non-transitory computer readable storage medium storing instructions that, when executed by a user equipment (UE), cause the UE to perform operations, the operations comprising:
receiving first radio resource control (RRC) signal from a base station serving the UE, the first RRC signaling instructing the UE to transmit a first device-to-device synchronization signal (D2DSS);
receiving a second RRC signal from the base station, the second RRC signal identifying a synchronization resource for transmitting the first D2DSS by the UE, wherein the first RRC signal is received independently from the second RRC signal; and
transmitting the first D2DSS over the synchronization resource.

19. The non-transitory computer readable storage medium of claim 18, wherein the synchronization resource is a time resource.

20. The non-transitory computer readable storage medium of claim 18, wherein the synchronization resource is a frequency resource.

21. The non-transitory computer readable storage medium of claim 18, wherein the synchronization resource is a time-frequency resource.

* * * * *